United States Patent [19]
Igarashi et al.

[11] Patent Number: 6,154,848
[45] Date of Patent: *Nov. 28, 2000

[54] MAINTENANCE SYSTEM AUTOMATICALLY EXECUTING PROCESSING JOBS ACCORDING TO A DEFINED WORK-FLOW

[75] Inventors: Yutaka Igarashi; Masaaki Takiuchi, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/691,576

[22] Filed: Aug. 2, 1996

[30] Foreign Application Priority Data

Aug. 4, 1995 [JP] Japan .................................. 7-199348

[51] Int. Cl.$^7$ .................................................. H04B 1/74
[52] U.S. Cl. ............................................... 714/4; 709/206
[58] Field of Search .................................... 395/676, 671, 395/200.33, 200.54, 200.56, 200.36, 182.13, 182.18, 200.47, 200.68, 680; 707/10; 714/4, 15, 20; 709/203, 206

[56] References Cited

U.S. PATENT DOCUMENTS

| | | | |
|---|---|---|---|
| 4,503,499 | 3/1985 | Mason et al. | 709/206 |
| 5,140,689 | 8/1992 | Kobayashi | 714/20 |
| 5,524,241 | 6/1996 | Ghoneimy et al. | 707/10 |
| 5,581,691 | 12/1996 | Hsu et al. | 714/15 |
| 5,634,127 | 5/1997 | Cloud et al. | 709/300 |
| 5,754,857 | 5/1998 | Gadol | 709/300 |
| 5,774,661 | 6/1998 | Chatterjee et al. | 709/203 |

FOREIGN PATENT DOCUMENTS

| | | |
|---|---|---|
| 0541381 A2 | 5/1993 | European Pat. Off. . |
| 0554854 A2 | 8/1993 | European Pat. Off. . |
| 0758114 | 2/1997 | European Pat. Off. . |
| 7-13754 | 7/1995 | Japan . |
| 2256069A | 11/1992 | United Kingdom . |
| 2276737 | 10/1994 | United Kingdom . |
| 2304214 | 3/1997 | United Kingdom . |
| 9616341 | 6/1999 | United Kingdom . |

OTHER PUBLICATIONS

Johann Eder et al., Workflow Recovery, IEEE Proceedings First IFCIS Internal Conference on Cooperative Information Systems, Jun. 1996, pp. 124–134.

Primary Examiner—Ahmad F. Matar
Assistant Examiner—Patrice Winder
Attorney, Agent, or Firm—Staas & Halsey LLP

[57] ABSTRACT

A maintenance system for a wide area work-flow system in which plural work-flow systems operates with linking via a wide area network. A historical information management unit is connected to the wide area network and maintains operation history information for each of the plural work-flow systems operating automatically according to the work-flow defining a processing job flow. When a work-flow system of the plural work-flow systems recovers from system-down, mismatch or discrepancy is detected by comparing the historical information of the work-flow system with the historical information of the other work-flow systems of the plural work-flow systems. To improve the reliability, the operation history information stored in the historical information management unit is used when the work-flow systems are recovered from system-down.

30 Claims, 15 Drawing Sheets

|   | A | B | C | D |
|---|---|---|---|---|
| A |   | ◯ | — | — |
| B | ◯ |   | ◯ | ◯ |
| C | — | ◯ |   | ◯ |
| D | — | ◯ | ◯ |   |

FIG. 4

SERVER A HISTORICAL INFORMATION

| IDENTIFICA-TION NUMBER | DATE & TIME | | ACTION |
|---|---|---|---|
| 10001 | 95/6/23 | 10:00 | a 1 TERMINATION |
| | 95/6/23 | 11:00 | a 2 TERMINATION |
| 10006 | 95/6/23 | 16:30 | send to server B |
| 10003 | ... | | ... |

SERVER B HISTORICAL INFORMATION

| IDENTIFICA-TION NUMBER | DATE & TIME | | ACTION |
|---|---|---|---|
| 10001 | 95/6/24 | 10:00 | receive from server B |
| | 95/6/24 | 11:00 | b 1 PROCESSING |
| 10006 | 95/6/23 | 12:30 | receive from server C |
| | 95/6/23 | 16:30 | b 1 TERMINATION |
| | 95/6/24 | 10:30 | b 2 PROCESSING |

F I G. 6

HISTORICAL INFORMATION SERVER

| SERVER | IDENTIFICA-TION NUMBER | DATE & TIME | | ACTION |
|---|---|---|---|---|
| A | 10001 | 95/6/23 | 10:00 | a1 TERMINATION |
| | | 95/6/23 | 11:00 | a2 TERMINATION |
| | | 95/6/23 | 16:30 | send to server B |
| | 10003 | ... | ... | ... |
| B | 10001 | 95/6/24 | 10:00 | receive from server A |
| | | 95/6/24 | 11:00 | b1 PROCESSING |
| | 10006 | 95/6/23 | 12:30 | receive from server C |
| | | 95/6/23 | 16:30 | b1 TERMINATION |
| | | 95/6/24 | 10:30 | b2 PROCESSING |
| C | ... | ... | | ... |
| D | ... | ... | | ... |

FIG. 7

| IDENTIFICA-TION NUMBER | DATE & TIME | | ACTION |
|---|---|---|---|
| 10006 | 95/6/23 | 12:30 | receive from server C |
| | 95/6/23 | 16:30 | b1 TERMINATION |

FIG. 8

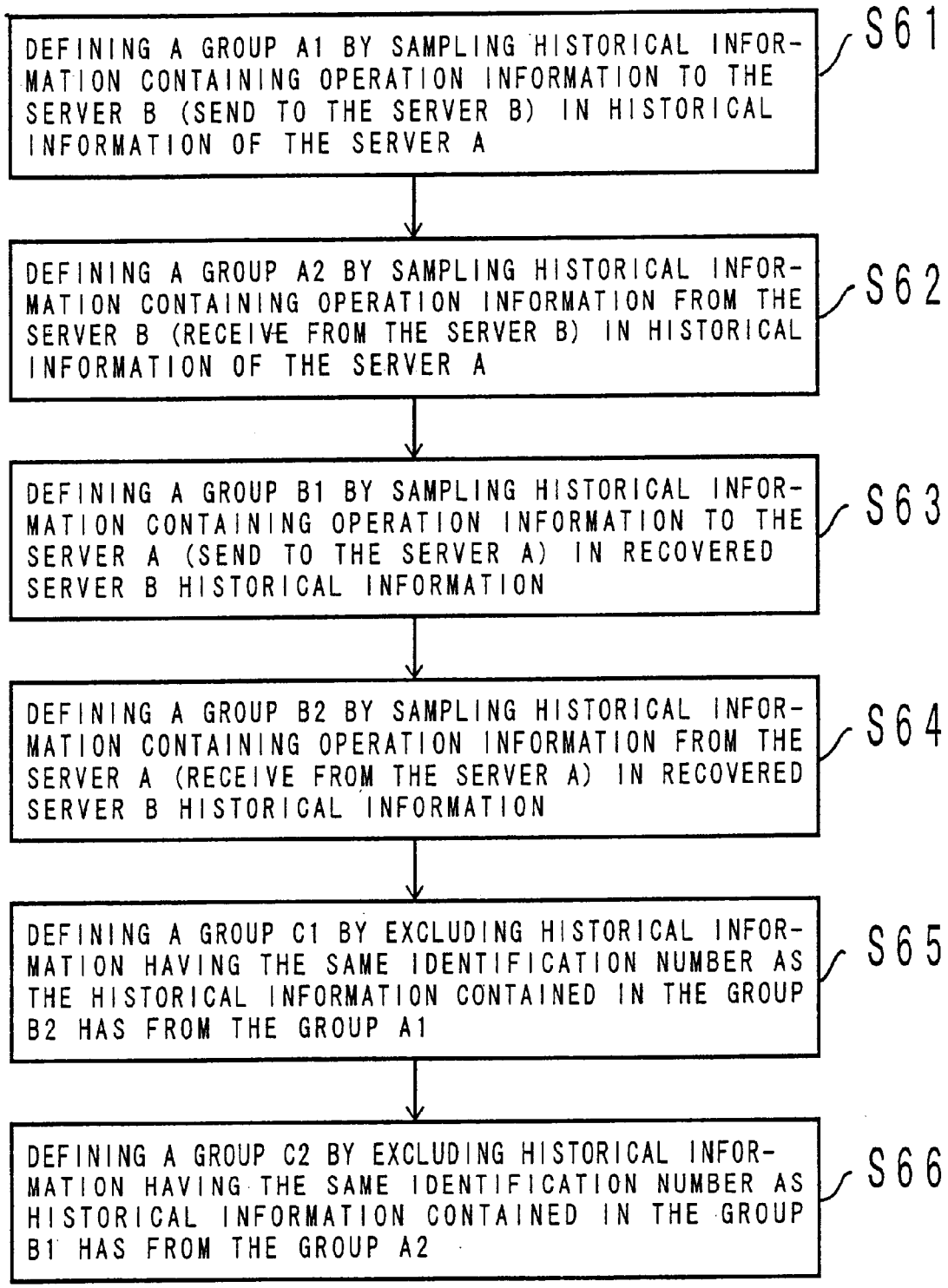
F I G. 1 5

MAINTENANCE SYSTEM AUTOMATICALLY EXECUTING PROCESSING JOBS ACCORDING TO A DEFINED WORK-FLOW

BACKGROUND OF THE INVENTION

1. Field of the Invention

The present invention relates to a maintenance system and method for a work-flow system for automatically executing processing jobs according to a work-flow defining the flow of the processing job, and more particularly to the maintenance system and method for the wide area work-flow system in which plural work-flow systems operate with relationships via a wide area network.

2. Description of the Related Art

A work-flow is a flow which defines a processing job flow, in which processing job information of who, what processing job, and in what order, is defined. A work-flow system is the system for automatically executing the processing jobs according to this work-flow. The work-flow system is a kind of groupware system which operates with a client/server system via a network in order to generally improve the productivity of the processing jobs. The historical and progressive situation for the work-flow are usually recorded in a data-base, and an administrator and worker can analyze the processing job progressive record if necessary. Further, they can change the definition of the work-flow.

A computer system capable of analyzing the work-flow by a person having no expertise, of managing a modelled work process operation, and of editing work-flow planning by changing processing job order 1, is described in a Japanese application assigned the same assignee of the present application and titled "Modelling method of the work process, tracing method of the work process model execution, and the computer system of a programming system modelling the work process" (Tokugan-Hei 6-50879, Tokkai-Hei 7-13754).

In this type of the work-flow system, the work can be linked, the processing job time is shortened, and the processing jobs operate with equal quality. Further, statistical information relating to the processing job results for each processing job can be extracted from the data-base, and there are features for analyzing any bottleneck and easily making an improvement plan for the processing job 1, by knowing which process is a time consuming process. The working process can be modified easily and the revised results are influenced immediately.

In the work-flow system based on the conventional client/server type, the management for the work-flow executed with linking between clients has been executed by one server. Thus, the processing job speed has been low since a number of clients have been sustained under only one server in order for the size of the system to become larger. So, the construction of a work-flow system using plural servers is required in order to improve the efficiency and expand the system.

However, a serious problem may arise when any work-flow system causes a system-down in the wide area work-flow system incorporating plural work-flow systems in which plural clients operate under one server and which enables each work-flow system to operate with linking via the network.

There is no problem usually because the work-flow system operates with work-flow information among servers being recorded in each data-base. However, there is a possibility of some work-flow information missing, such as historical information missing, in the data-base even if the data-base for any work-flow system server is recovered from the system-down after the system-down occurred.

The process can be executed based on the work-flow information of the data-base even if there is work-flow information missing in the data-base of each server after recovery, so the work-flow system which is closed within the server, such as one work-flow system, will not cause any operational contradiction for the work-flow system execution. On the other hand, the whole operation for the plural work-flow systems may be abandoned if flow information, such as the historical information, has some discrepancy among servers.

FIG. 1 is an explanatory view for this type of problem. Now we suppose that, in FIG. 1, the processing jobs a1 and a2 are executed in server A1, for example, and the processing jobs b1 and b2 are executed in a server B2. Then, we suppose that the processing job of a process X progresses to the processing job step of the process b1, when the processing job X is executed according to the work-flow.

At this point, work-flow historical information in the data-base of a server A1 is:

A1: the processing job a1 is executed according to the process X, and the result is input to the processing job a2; and A2: the process X is received from the processing job a1, then the processing job a2 is executed, and the result is input to the processing job b1 via the network 3.

On the other hand, the work-flow historical information in the data-base of a server B2 is:

B1: the process X is received from the processing job a2 via the network and the processing job b1 is started.

At this point, we suppose that the server B2 caused a system-down and the historical information for the process was lost after the system was recovered. In this case, the problem has arisen in which the process would be shut down finally since the process X did not exist in the server B2 and subsequently the process X could not be executed, although work-flow history in the server A1 showed "the process X is completed in the server A" and the operator in the server A1 might therefore think that the processing job relating to the process X was assigned to the server B2.

SUMMARY OF THE INVENTION

An object of the present invention is to provide a system and method for analyzing whether or not work-flow (operation) historical information among servers has any mismatch in the system in which plural work-flow systems including each client/server system operate with linking via a wide area network, and for maintaining a wide area work-flow system based on the analyzed result.

Another object of the present invention is to improve the operation efficiency and reliability of the wide area work-flow system by comparing perfectly the historical information among servers when some work-flow system recovers from a system-down in the wide area work-flow system, and recovering speedily the whole wide area work-flow system by detecting speedily the mismatch if the historical record has a mismatch.

A historical information management unit is a historical information management server, for example, which keeps the reliability of the linked operation for the whole wide area work-flow system. Each operation history of plural work-flow systems is recorded in the data-base of the historical information management server. For example, the operation history is recorded in the data-base of the historical information management unit via the network and also in the data-base for each work-flow system, each time the operation depending on the work-flow is executed in each work-flow system.

Each work-flow system is the client/server system each including one server, for example, and more than one clients managed by the server.

The historical information management unit, for example, the data-base of the historical information management server, can store only historical information for the operation executed among the servers.

Now, we suppose that arbitrary one work-flow system among plural work-flow systems caused a system-down. The server of the work-flow system requests the operation history for the self-server to be given from the historical information management unit such as the historical information management server, when the system is recovered from the system-down. Then, the historical information management server reads the requested operation history from the data-base and outputs it to the server of a recovered system, and the server of the recovered system compares the operation history given from the historical information management server with the operation history stored in the data-base, for example, for the self-server. Therefore, the reliability of the whole wide area work-flow system can be maintained by detecting the mismatch in the operation history.

According to the present invention as described above, each operation history of the plural work-flow systems is stored in the data-base of the historical information management server, for example. Thus, the system maintenance is made with keeping the whole system's reliability by using the operation history stored in the data-base of the historical information management server, when the system-down is recovered.

BRIEF DESCRIPTION OF THE DRAWINGS

The present invention will be more apparent from the following detailed description in conjunction with the accompanying drawings, in which:

FIG. 4 is an example of a correlation table;

FIG. 6 is an explanatory table showing historical information in each server of FIG. 5;

FIG. 7 is an explanatory table showing historical information of the historical management server;

FIG. 8 is an explanatory table showing historical information of server B recovered from the system-down;

FIG. 15 represents a flowchart (No. 2) showing a historical information comparison process.

DESCRIPTION OF THE PREFERRED EMBODIMENT

Figure 2:
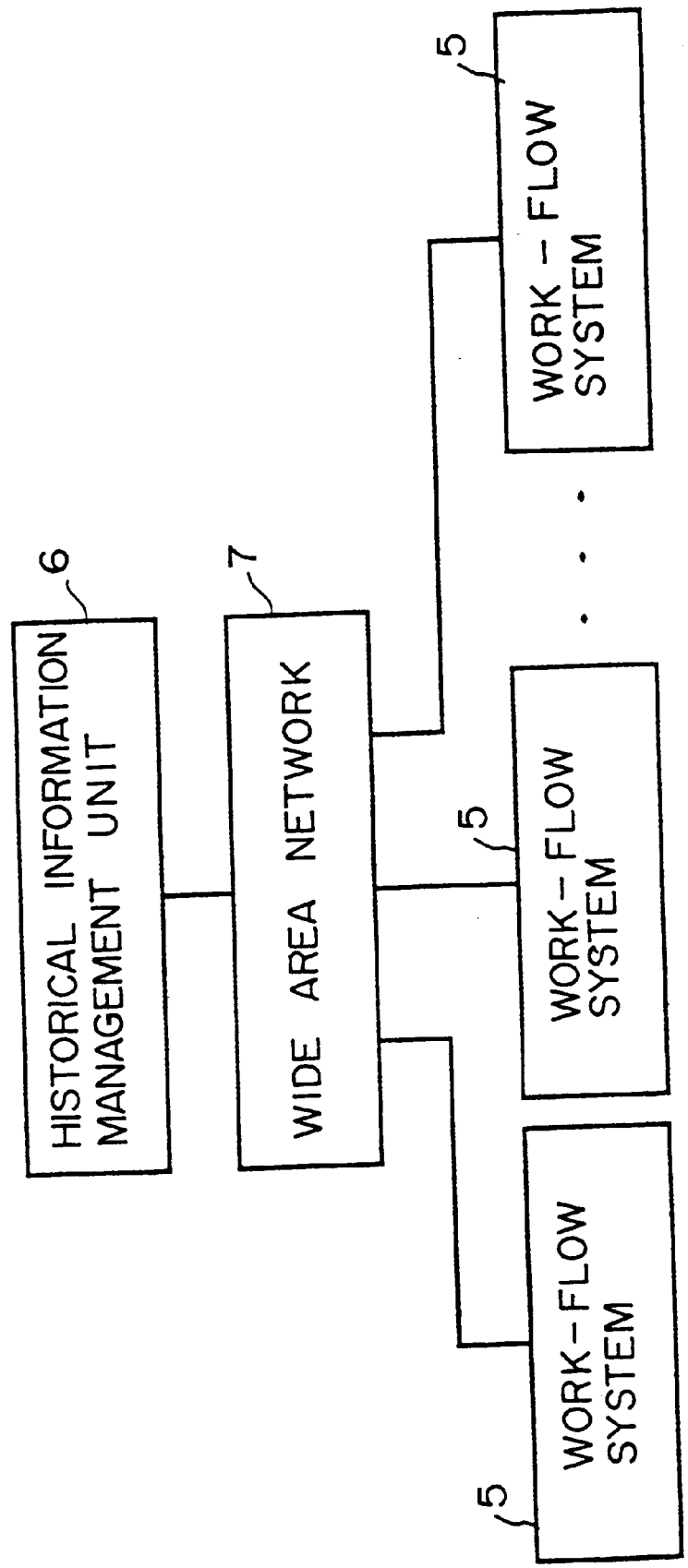
FIG. 2 shows a principle block diagram of the present invention.

FIG. 2 is a principle block diagram of the present invention for the maintenance system and method of a wide area work-flow system in which plural work-flow systems, which execute the processing job automatically according to the work-flow defining the processing job flow, operate with linking via the wide area network.

A historical information management unit 6 is a historical information management server, for example. The operation history for each of plural work-flow systems 5 is stored in a data-base. For example, the operation history is stored in the data-base of the historical information management unit 6 via a wide area network 7, while the operation history is stored in the data-base of each work-flow system each time the operation following the work-flow is executed in each work-flow system.

Each work-flow system 5 is the client/server system including one server, for example, and more than one client managed by the server, and the data base of the historical information management unit 6, such as the historical information management server, is able to store the historical information for the operation processed between the servers as the operation history of each work-flow system.

Now, we suppose that an arbitrary work-flow system among the plural work-flow systems 5 in FIG. 2 caused the system-down. When the system is recovered from the system down, the server of the work-flow system requests the operation history for the self-server to be given from the historical information management unit 6, such as the historical information management server. Then, the historical information management server reads the requested operation history from the data-base and outputs it to the server of a recovered system, and the server of the recovered system compares the operation history given from the historical information management server with the operation history stored in the data-base, for example, for the self-server. Therefore, the reliability of the whole wide area work-flow system can be maintained by detecting the mismatch of the operation history.

Figure 3:
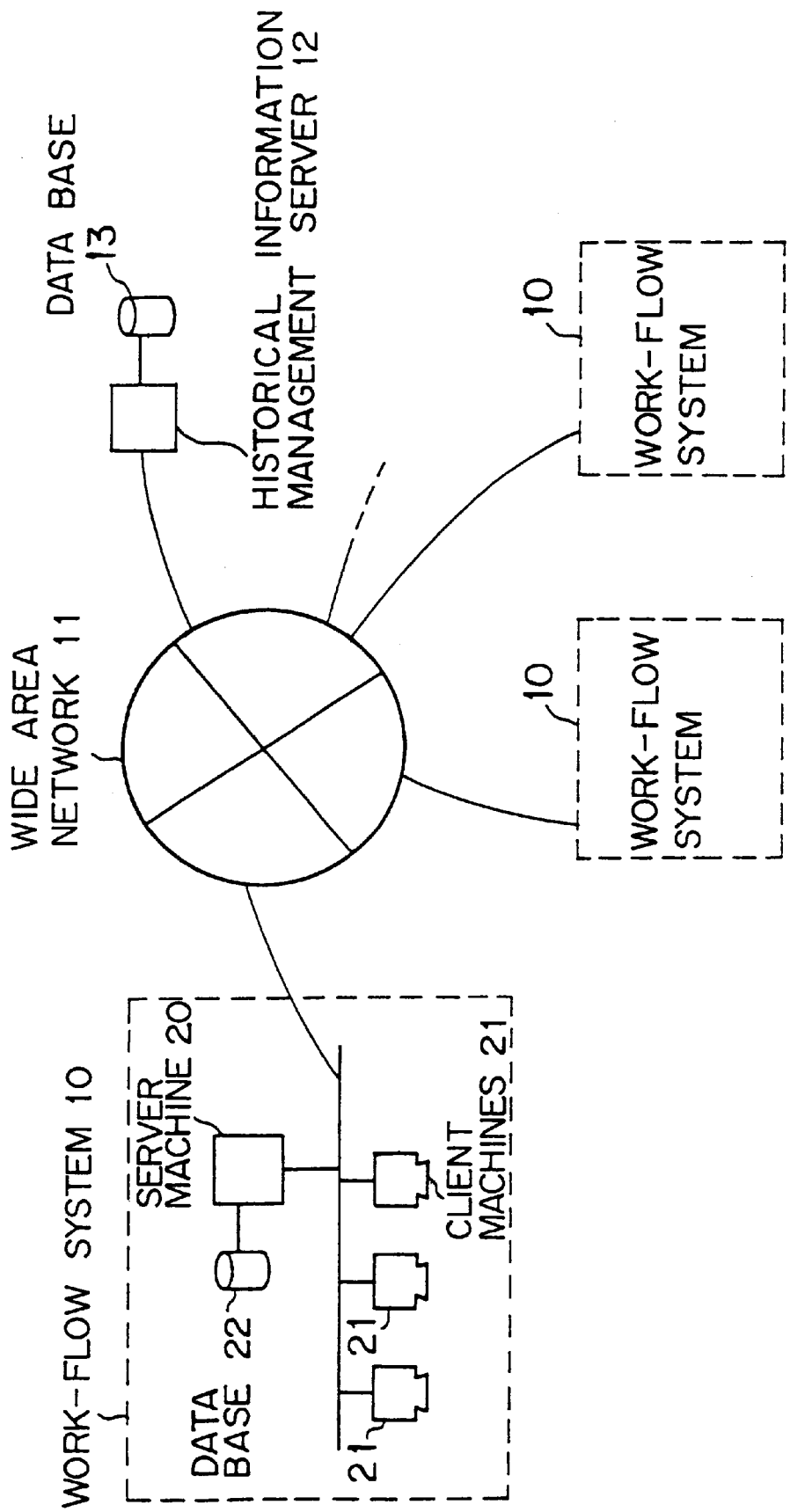
FIG. 3 is an illustration for showing a whole wide area network system for operating the maintenance system of the present invention.

FIG. 3 is a whole view of a wide area work-flow system for proceeding the maintenance system of the present invention. In FIG. 3, each work-flow system 10 as the client/server system is connected via a wide area network 11. Further, a historical information management server 12, which maintains the reliability of the linking operation for the whole wide area work-flow system by using the work-flow operation history for each work-flow system 10, is connected to the wide area network 11, and the historical information management server 12 includes a data-base 13 which stores the operation history.

Each work-flow system 10 includes one server machine 20, plural client machines 21, and a data-base 22. All operation history in each work-flow system, which is included in the data-base 22 of each work-flow system 10, is stored in the data-base 13 connected to the historical information management server 12, or the history relating to the operation executed between the server machines 20 of each work-flow system 10 is stored in the data-base 13 connected to the historical information management server 12.

Plural work-flow systems 10 are connected with each other via a wide area network 11 as illustrated in FIG. 3, although one work-flow system 10 is not defined as operating regularly with linking to all other work-flow systems 10. Generally, one work-flow system 10 operates with linking to a small number of work-flow systems 10 among many other work-flow systems 10. For example, when a first branch office has a relationship with a first trade division, although there are the first branch office, the second branch office, the first trade division, and the second trade division (each corresponds to one work-flow system) under the main office, the work-flow system corresponding to the first branch office automatically operates the processing job following the work-flow with linking only to work-flow system corresponding to the first trade division. Therefore, the work-flow system corresponding to the first branch office does not require the historical information relating to all other work-flow systems. For example, when the work-flow system 10 corresponding to the first branch office has caused the system-down and thereafter is recovered, it is enough to check whether or not the operation history has any mismatch with the work-flow system 10 corresponding to the first trade division.

Figure 4:
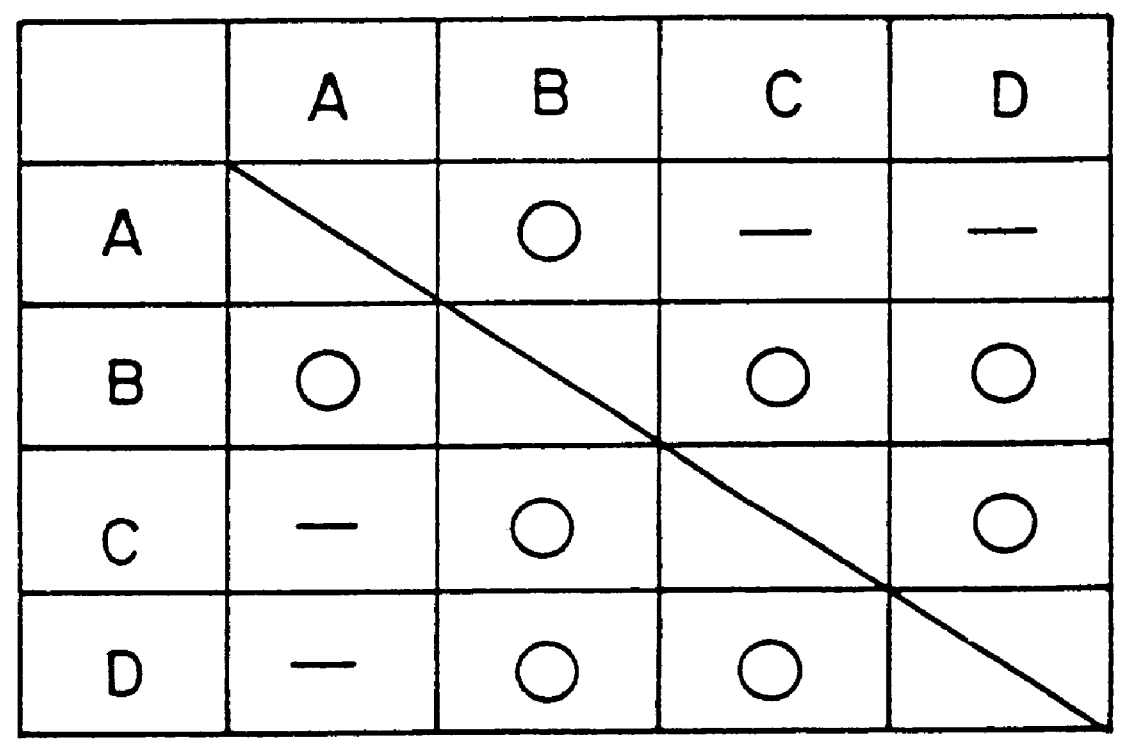

FIG. 4 is an example of a correlation table showing dependency relationships between these work-flow systems. In FIG. 4, dependency relationships, which define how each work-flow system 10 operates with linking to other work-flow systems in the whole wide area work-flow system, are shown. For example, as the work-flow system A operates only with the work-flow system B, it is checked whether or not the operation history has any contradiction with the system B, when the system A is recovered. On the other hand, when the system B is recovered from the system-down, it should be checked whether or not the operation history has any mismatch not only with A, but also with C and D.

Figure 1:
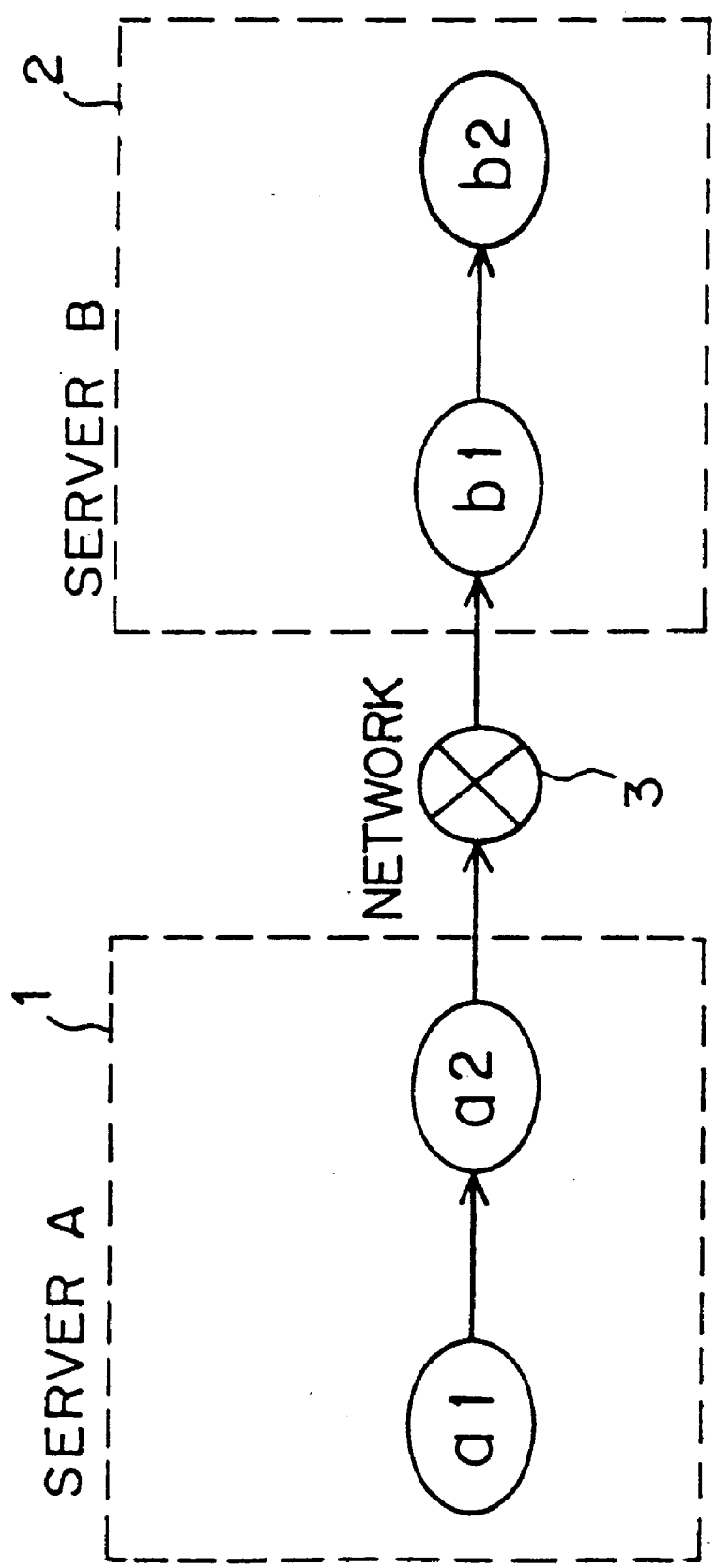
FIG. 1 is a schematic illustration explaining the problem in the conventional work-flow system.
Figure 5:
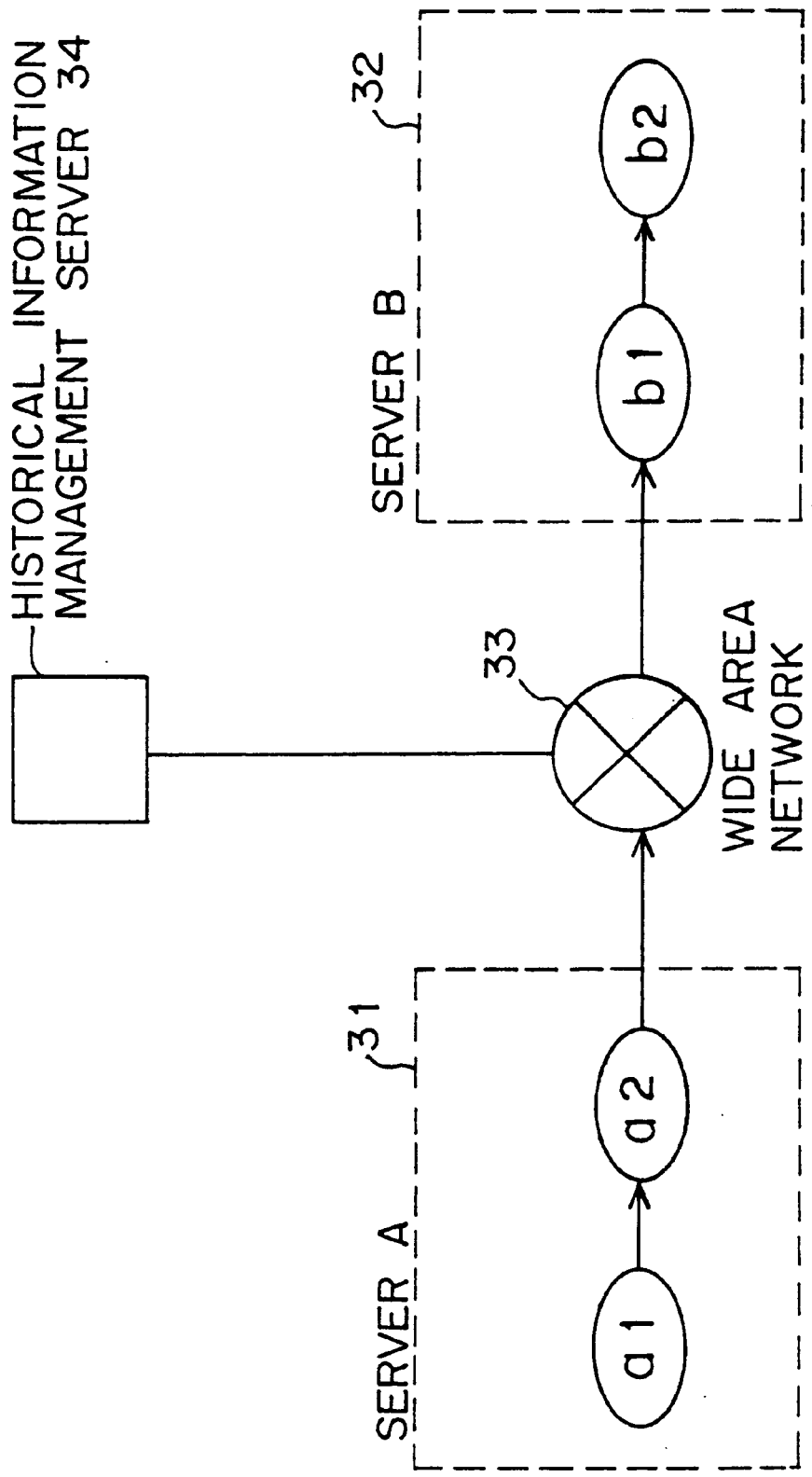
FIG. 5 is a schematic illustration showing the connection between a historical information management server and a server.

FIG. 5 is a schematic illustration showing the connection between a historical information management server and a server. In FIG. 5, a server B 32 and a server A 31 as each work-flow system server similarly as shown in FIG. 1, are connected via a wide area network 33, and a historical information management server 34 is also connected to the wide area network 33. In FIG. 5, similarly as shown in FIG. 1, the processing job order for the processing jobs a1 and a2 in the server A 31 and the processing jobs b1 and b2 in the server B 32 are made.

Here, similarly as shown in FIG. 1, we suppose that the server B 32 has caused the system-down right after the server B 32 started the processing job b1. The server B 32 acquires the historical information for the operation relating to the server B from the historical information management server 34 when the system-down is recovered. If the only historical information for the operation (processing job progression) executed between the servers is stored in the data-base of the historical information management server 34, the historical information A2 for the server A, that is to say, the historical information in which the processing job a2 has been executed and the procedure X has progressed in the processing job b1 of the server B via the network, the historical information B1 for the server B, that is to say, the procedure X has been received from the server A 31 as the result of the processing job a2 and the processing job b1 has started, are stored in the data-base of the historical information management server 34, in the example of FIG. 5.

On the other hand, in the server B 32, there is no historical information for the procedure X in the data-base connected to the self-server when the system-down is recovered, so the historical information mismatch for the procedure X can be found by comparing the historical information for the server B stored in the data-base of the historical information management server 34 with the historical information stored in the self-server. If the procedure in which the mismatch has been made is specified, the procedure can be re-executed if necessary, the historical information A2 can be rewritten (deleted, for example) for the server A, and the historical information A2 can be revised correctly for the work-flow. Here, the way to recover the whole system operation after specifying a discrepant procedure is according to the case, so the detailed explanation is not made in this specification because it is beyond the scope of the present invention.

For the example of the connection among servers in FIG. 5, the historical information comparison is explained in more detail by using FIGS. 6 to 8. FIG. 6 shows each server history stored in each data-base in the server A 31 and server B 32. Basically, this historical information is stored in time order, the results sorted by an identification number are shown here in FIGS. 6 to 8. The data structure of the historical data depends on the data-base, and an identification number, date information, and action information showing the termination of the processing job a1 in the server A, for example, are required. Here, the identification number is a number to identify the procedure in the wide area work-flow system and is equal to the number of the management file managed by the whole system, for example. Further, the empty area for the identification number designates that the identification number is equal to the number in the above line.

FIG. 7 is an explanatory table showing historical information stored in the data-base of the historical management server. Here, the stored information in the data-base of the historical information management server is not only the historical information for the operation executed among servers but also data which are identical to the historical information stored in the data-base in each server. Here, the historical information can be written in the data-base of the historical information management server at the same time as when the historical data for each server are made, or the stored whole historical information can be written with a constant time delay after storing once the historical data in a suitable buffer.

FIG. 8 shows the historical data in the data-base of the server B 32 when the historical information after June 24th is lost as the server B 32 caused the system-down on June 24th. Only two lines of historical data for the identifying number 10006 are recovered, and the data after June 24th are lost.

When the historical data for the operation executed between the servers among the historical data for the server B of the data-base in the historical information management server in FIG. 7 is compared with the content of FIG. 8, the historical data in the data-base of the historical information management server are two lines of:

"10001 receive from server A;" and

"10006 receive from server C."

On the other hand, the historical data in the data-base of the server B in FIG. 8 is:

"10006 receive from server C."

By comparing both of these historical data, the system can recognize that the historical data has a mismatch between the servers for the identifying number 10001, the processing job received from the server A. Here, the processing job having the identifying number 10006 corresponds to the processing job in which processing job $C_1$ and $C_2$ in the server C, for example, are executed, the result is sent to the server B, and the processing job $b_1$ and $b_2$ are executed.

Further, we suppose the case in which the historical information of the server A in FIG. 6 and the contents in the data-base of server B32 in FIG. 8 are compared.

In the historical information of the server A in FIG. 6, the historical data for the operation among servers is:

"10006 send to server B."

In FIG. 8, there is no corresponding historical data to the above, so a mismatch of the historical information among servers has arisen.

In the above example, according to the historical data of the server B, the processing job result has not been received, although the server A sent the processing job result to the server B. On the other hand, even if the historical data of the server A became in the condition of not sending the processing result, the mismatch of the historical information between the servers can be found by the corresponding historical information comparison.

In the examples of FIGS. 6 to 8, the historical information relating to the server B is obtained from the historical information in the data-base of the historical information management server 34. However, it will take a long time to search for only the historical information relating to the server B, since the historical information for all servers in the wide area work-flow system is usually stored in the data-base of the historical information management server 34. The correlation table explained in FIG. 4 is used for shortening the searching time. Namely, the searching time can be shortened without searching for all the server's historical information, by analyzing only the historical information for the work-flow system server executing the operation having the dependency relationship with the operation of the server B, by referring to the correlation table.

All server is historical information is stored in the data-base of the historical information management server, according to FIGS. 6 to 8. But the data-base linked with all servers connected in the wide area work-flow system can be searched without specially installing specially the historical information management server, if the number of servers connected in the wide area work-flow system is small. In this case, the processing job time to get the historical information can be reduced by keeping the correlation table representing the operation dependency relationship among the work-flow systems, in a common machine connected to the network, such as a preservation server for the whole wide area work-flow system, for example.

Next, the mismatch detection for the historical information in the present invention, such as the detecting method for the procedure for which the historical information in the server recovered from the system-down does not match with the historical information in the historical information management server or the other servers, will be explained in more detail. The difference in the detection flow for a mismatch procedure is based on the case in which this mismatch procedure detection is executed in the historical management server, or in the preservation server, or whether or not the historical information management server itself is installed.

Figure 9:
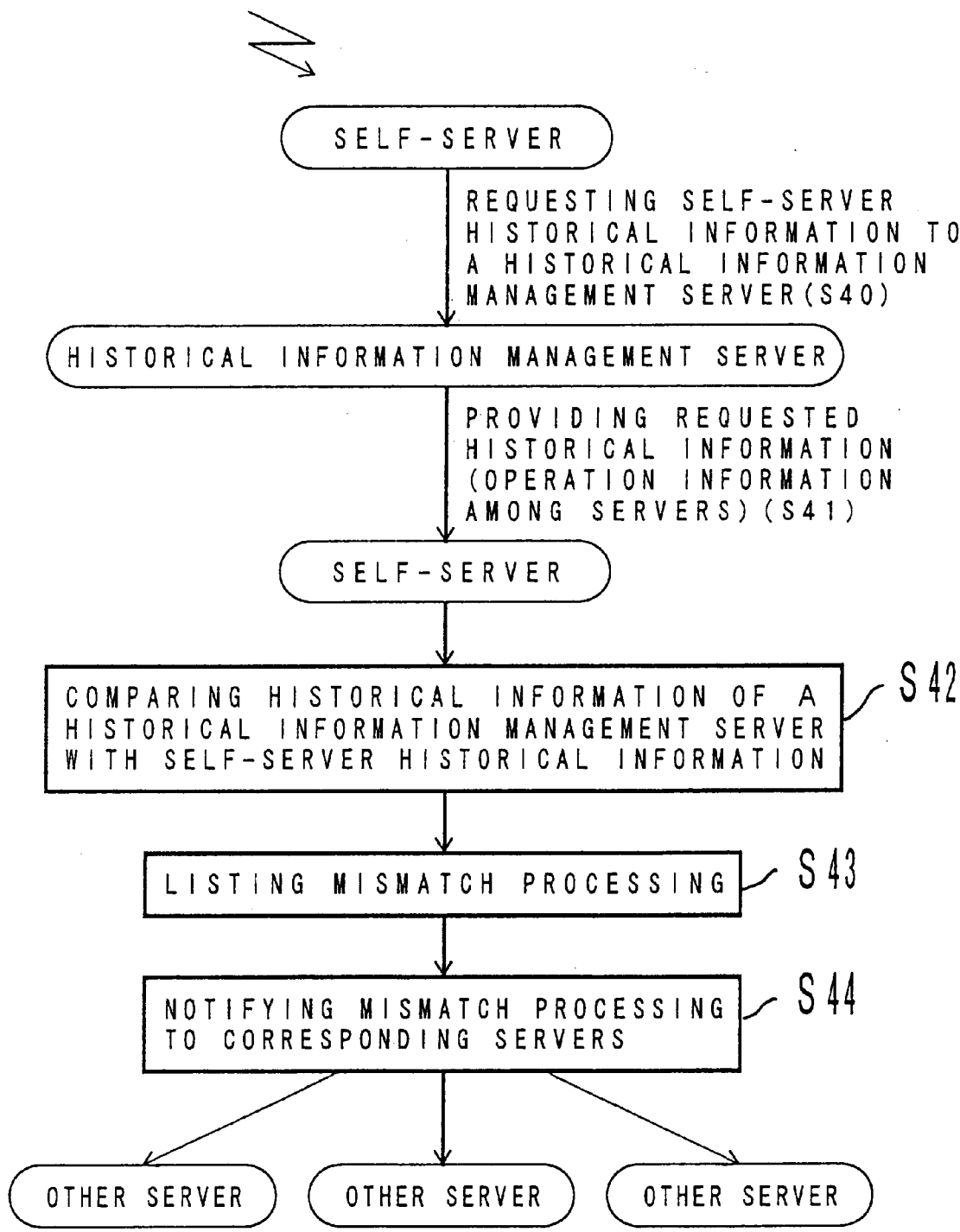
FIG. 9 represents a flowchart (No. 1) showing a discrepant information detection process.

FIG. 9 is a flowchart of the procedure in which the server itself recovered from the system-down detects the mismatch procedure. This flow can be started by recovery notification from the system-down or operator's manual notification.

The system server recovered from the system-down, that is, the self-server requests the historical information for the self-server to the historical information management server at step S40. Then, the historical information management server provides the historical information requested at step S41 such as only the operation information among servers, the self-server to which the historical information is provided compares the historical information in the self-server with the historical information in the historical information management server at step S42, and generates a mismatch list at step S43, and the flow terminates by notifying the mismatch procedure to the corresponding servers at step S44. Here, in this example, the intrinsic role of the historical information management server is to store the historical information for each work-flow system.

Figure 10:
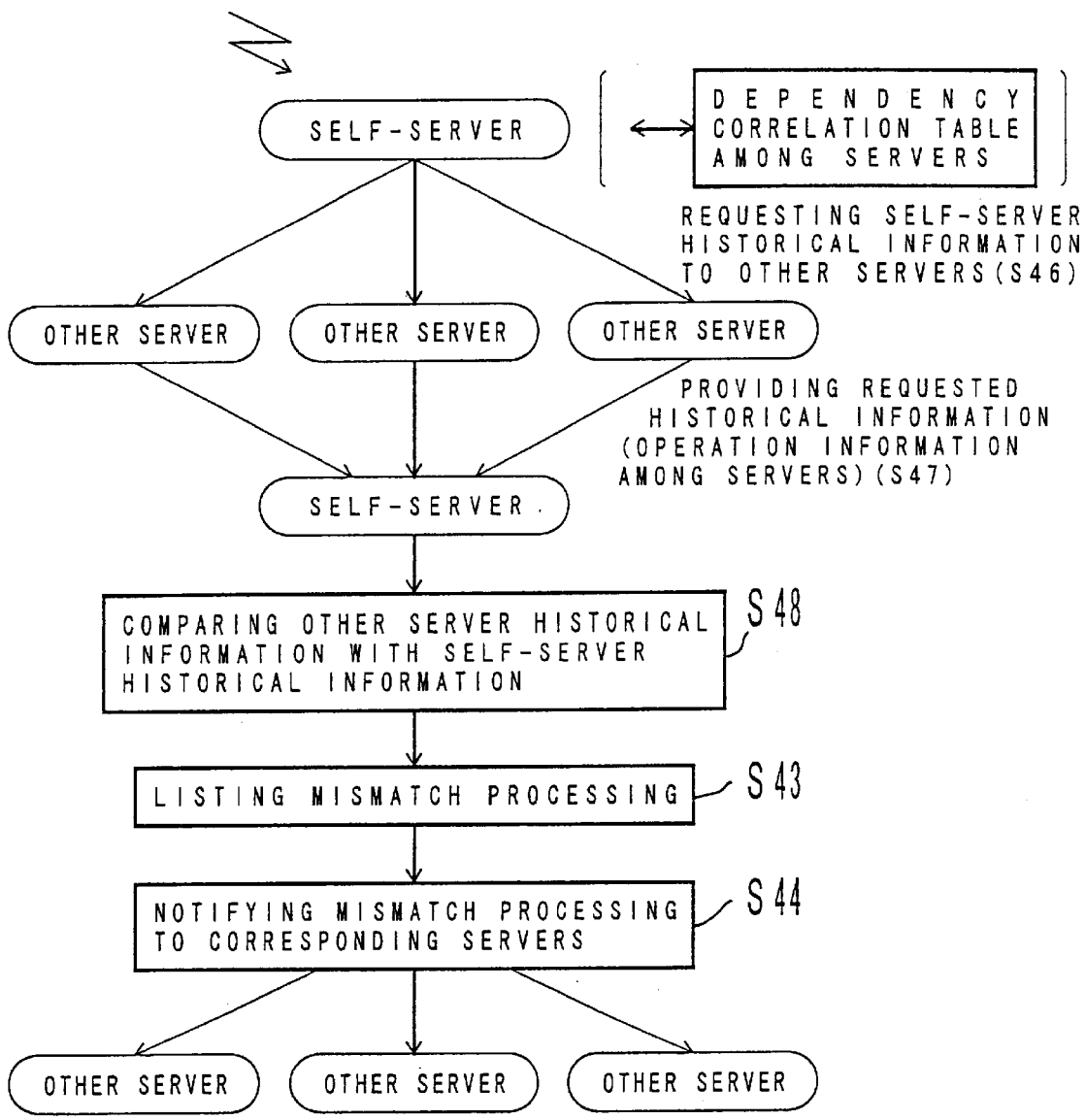
FIG. 10 represents a flowchart (No. 2) showing a discrepant information detection process.

FIG. 10 is a process flowchart for the case in which the server of the work-flow system recovered from the system-down, that is, the self-server detects the mismatch procedure similarly as shown in FIG. 9, and for the case in which the historical information management server is not located in the wide area work-flow system. At step S44, the self-server refers to the correlation table showing dependency relationships between the servers, if necessary, requests the historical information for the self server to the other servers, and the other servers provide the historical information requested at step S47, such as the information for the operation between the servers. Then the self-server to which the information was provided compares the historical information provided from the other servers with the historical information in the self-server at step S48, generates the mismatch processing job list at step S43, and the flow terminates after notifying the mismatch procedure to the corresponding servers at step S44.

Figure 11:
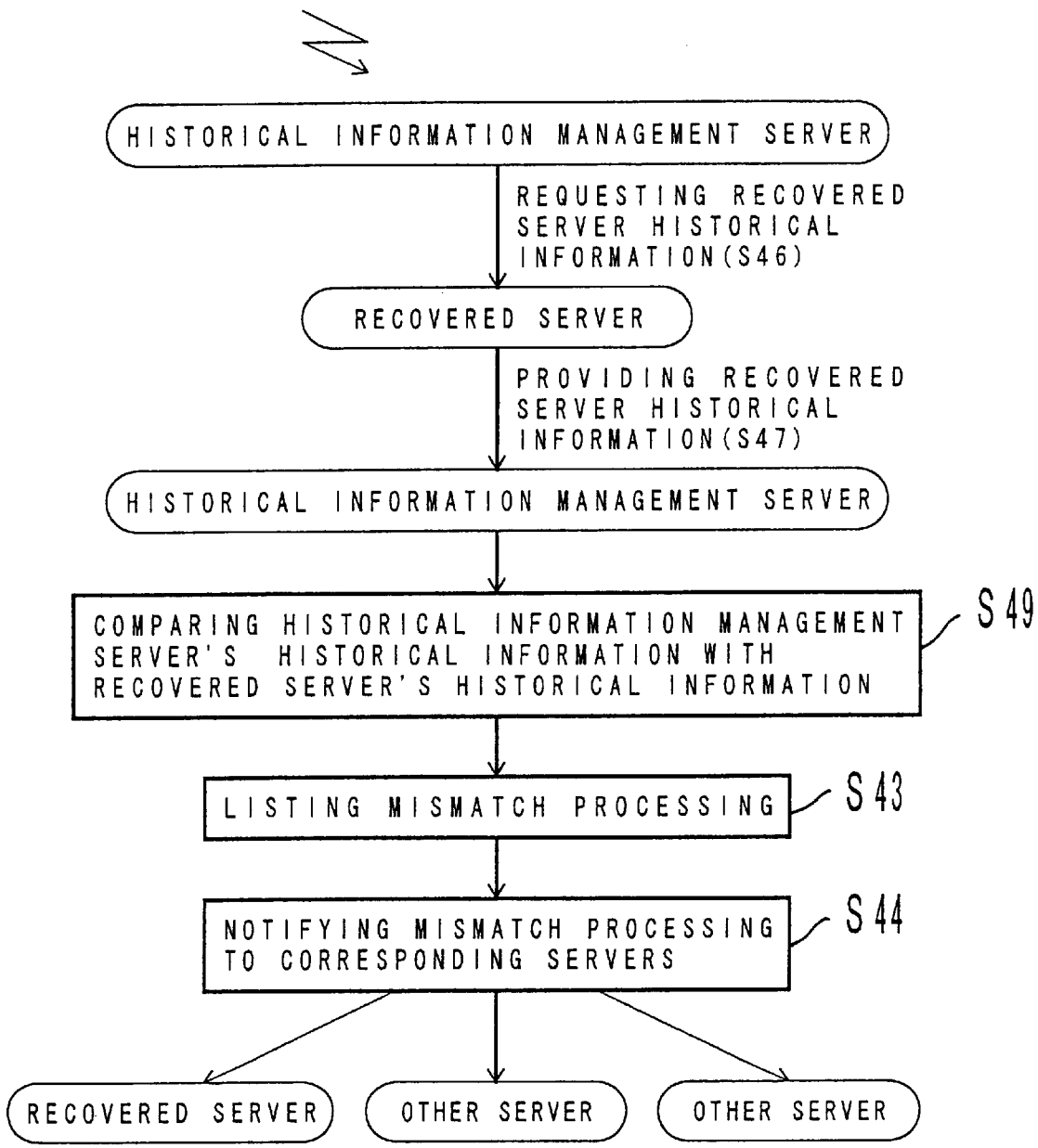
FIG. 11 represents a flowchart (No. 3) showing a discrepant information detection process.

FIG. 11 is a process flowchart for the case in which the historical information management server detects the mismatch procedure, and shows the basic procedure executed in FIGS. 2 or 3 of the present invention. The historical information management server starts the mismatch procedure detection based on the recovery notification from the system-down or the operator's manual notification requests historical information to the recovered server at step S46, and the recovered server provides the historical information at step S47. The historical information management server compares the historical information for the recovered system in the historical information management server at step S49 with the historical information provided from the recovered server, generates the mismatch processing job list at step S43, and the flow terminates after notifying the mismatch processing job to the corresponding servers at step S44.

Figure 12:
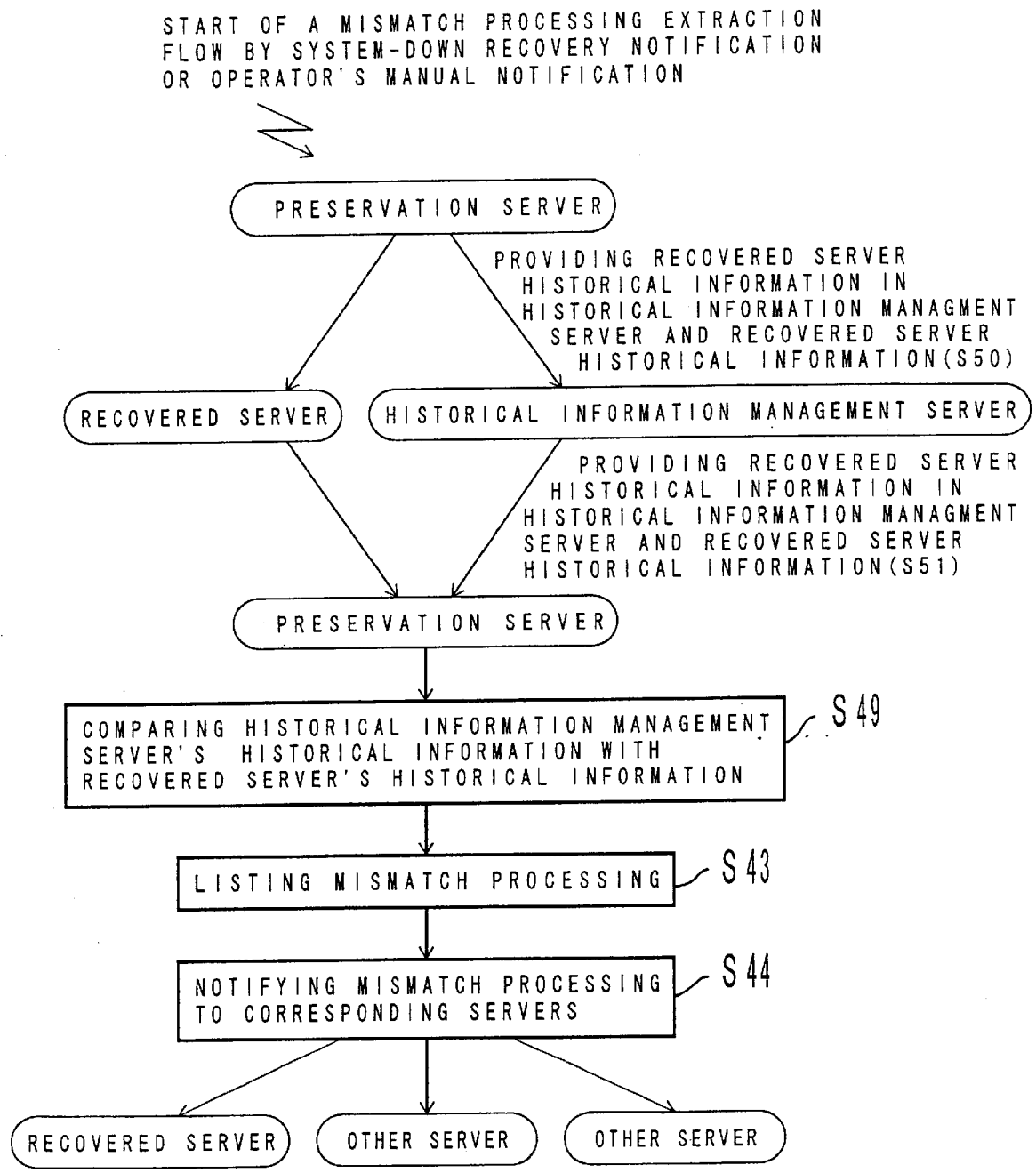
FIG. 12 represents a flowchart (No. 4) showing a discrepant information detection process.

FIG. 12 is a process flowchart for the case in which the preservation server managing the maintenance of the whole wide area work-flow system executes the mismatch procedure detection. The preservation server starts the mismatch procedure detection based on the recovery notification from the system-down, or the operator's manual notification, and at step S50, the recovered server historical information and the historical information for the recovered server in the historical information management server are requested to the recovered server and the historical information management server respectively. These requested informations are provided to the preservation server at step S51. The preservation server compares the historical information in the historical information management server at step S49 with the historical information provided from the recovered server, and generates the mismatch processing job list at step S43, and the flow terminates after notifying the mismatch processing job to the corresponding servers at step S44.

Figure 13:
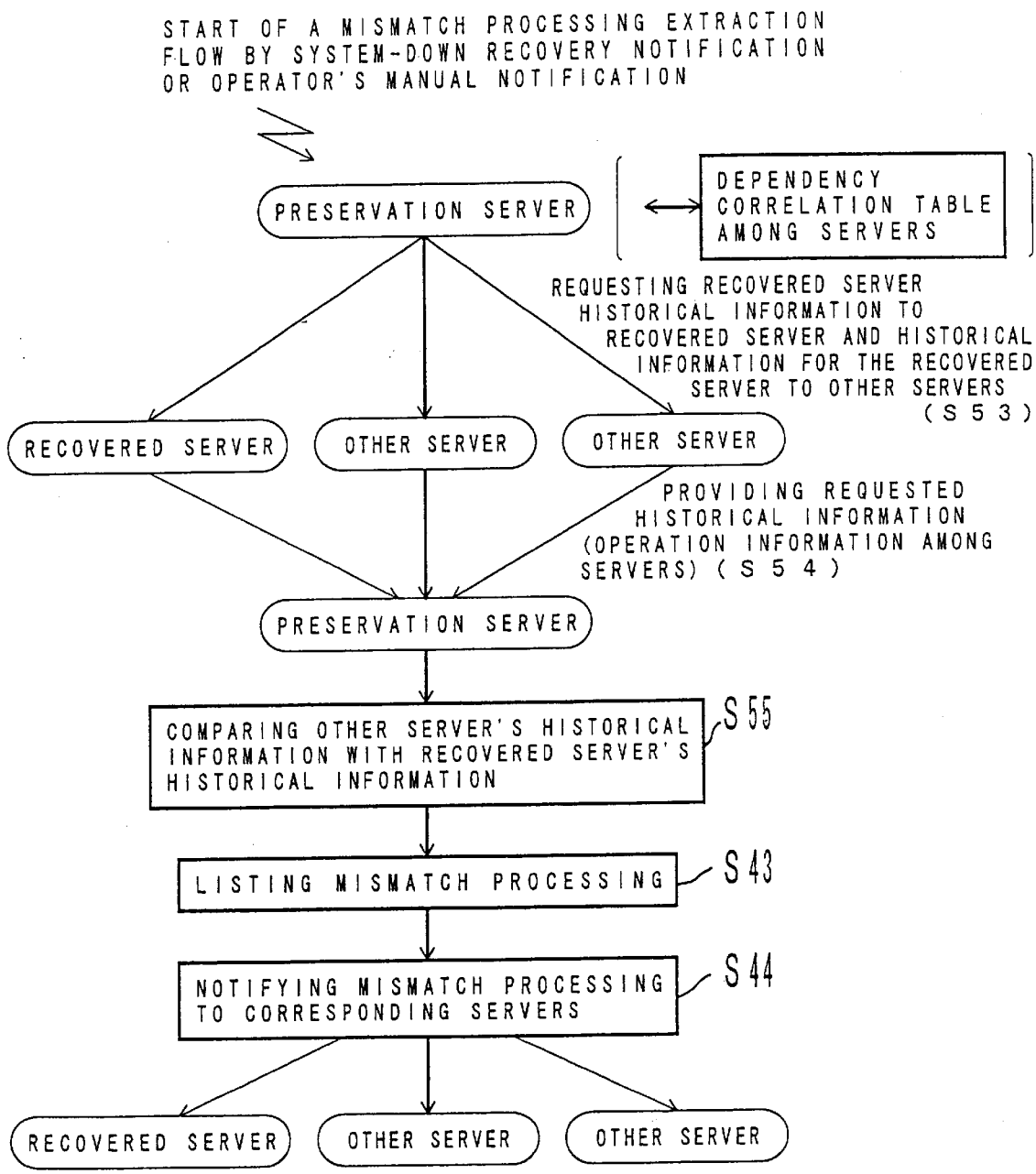
FIG. 13 represents a flowchart (No. 5) showing a discrepant information detection process.

FIG. 13 is a process flowchart for the preservation server to detect the mismatch procedure as shown in FIG. 12, and is a process job flowchart for the case in which the historical information management server does not exist. In FIG. 13, the preservation server starts the mismatch procedure detection, based on recovery notification from the system-down or operator's manual notification, and refers to the correlation table for the dependency relationship among servers, if necessary. The preservation server requests self-server historical information to the recovered server, and historical information concerning the recovered server to the other servers at step S53, and the requested historical information, such as only the operation information between the servers are provided to the preservation server at step S54. The preservation server compares historical information from the recovered server with historical information from the other server at step S55, and generates the mismatch processing job list at step S43, and the flow terminates after notifying the mismatch processing job to the corresponding servers at step S44.

Figure 14:
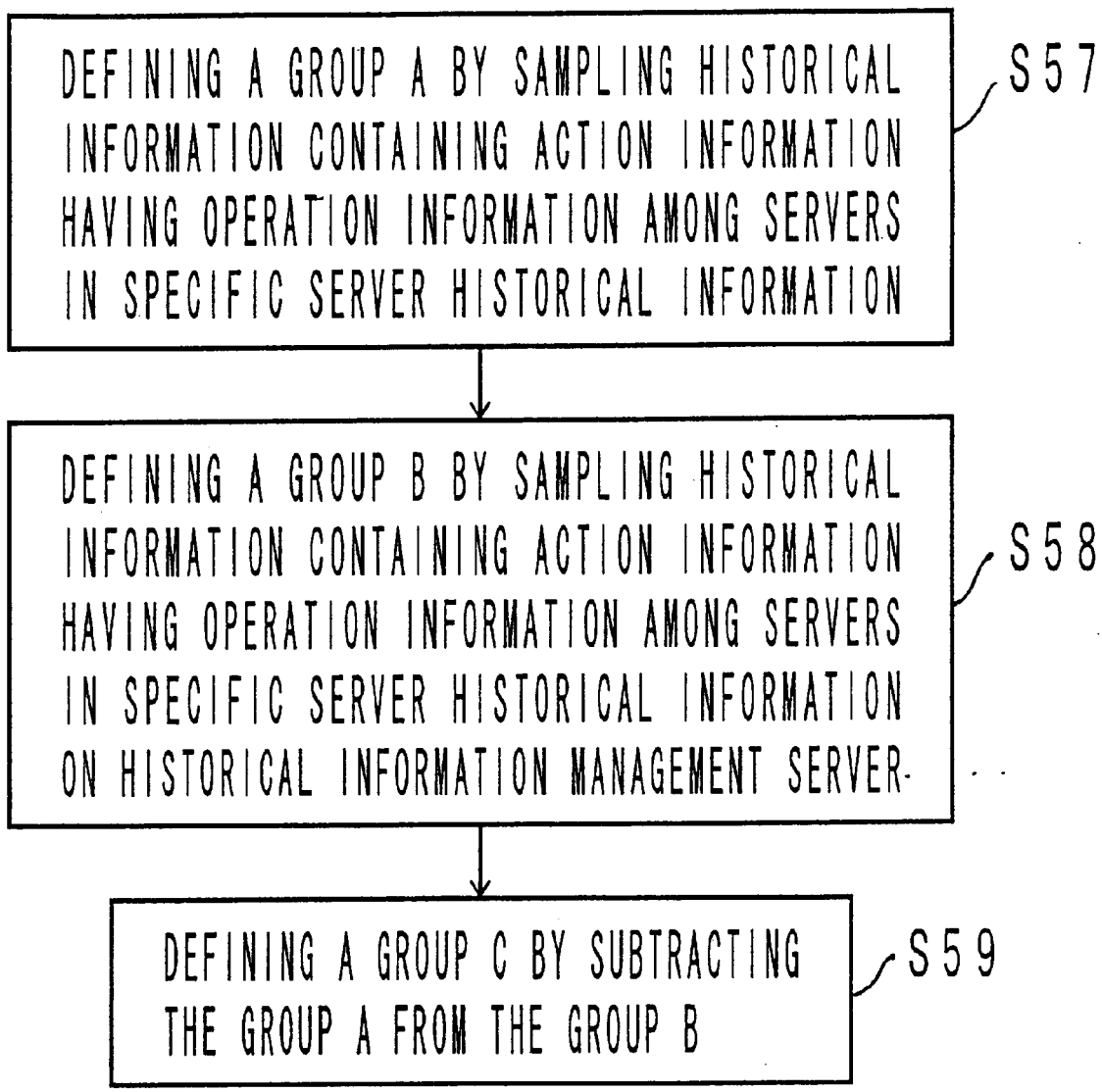
FIG. 14 represents a flowchart (No. 1) showing a historical information comparison process.

FIGS. 14 and 15 are detailed process flow-charts for the historical information comparison. FIG. 14 is a process flowchart for the case in which the historical information for the specific server in the historical information management server and the specific server historical information are compared. This process flowchart corresponds to step S42 in FIG. 9 and step S49 of FIG. 11 and FIG. 12.

In FIG. 14, the historical information including action information having the operation information between the servers is sampled in the specific server historical information and defined as a group A at step S57. The historical information including the action information having the operation information between the servers from the historical information for the specific server in the historical information management server is sampled at step S58, and defined as a group B. Then, the group A is subtracted from the group B, and the result is defined as a group C at step S59, and the flow terminates. The historical information included in the group C is information for the mismatch processing job, so it is determined which server interaction and which processing job transaction have caused the mismatch, based on the action information having the operation information between the servers and the historical information identification number of the group C.

FIG. 15 is the process flow-chart for the case in which there is no historical information management server and historical information comparison between the recovered server and the specific server is executed, and corresponds to the processing for step S48 in FIG. 10 and step S55 by the preservation server in FIG. 13. Here, the processing is explained by defining the recovered server as a server B and a specific server, for which historical information is compared with the server B, as a server A.

In FIG. 15, at step S61, the historical information including the operation information to the server B (send to server B) among the historical information in the server A is sampled, and defined as a group A1. At step S62, the historical information including the operation information from the server B (receive from server B) is sampled and defined as a group A2. Then, at step S63, the historical information including the operation information to the server A (send to server A) is sampled and defined as a group B1. At step S64, the historical information from the server A (receive from server A) among the historical information in the server B after recovery is sampled and defined as a group B2. At step S65, the historical information having the same identification number as the historical information included in the group B2, has is excluded from the group A1, and the result is defined as a group C1, in order to detect the mismatch processing job. At step S66, the historical information having the same identification number as the historical information included in the group B1 has is excluded from the group A2, and the result is defined as a group C2, and the flow terminates. The historical information included in the group C1 and C2 is the information for the processing job in which the mismatch has occurred in the historical information, and it is identified which server interaction and which processing job transaction have caused the mismatch, based on the action information having the operation information between the servers and the historical information identification number for the group C1 and C2.

As described in detail in the above description, according to the present invention, the historical information comparison can be made perfectly between the server interactions when any work-flow system is recovered from a system-down. The whole wide area work-flow system can be recovered because the mismatch can be detected speedily if there is a mismatch in the historical information. The reliability and operation efficiency for the wide area work flow system can be improved greatly.

What is claimed is:

1. A computer-readable recording medium used to direct a computer to function in a particular manner when used by the computer for a server of a work-flow system recovered from system-down to detect operation historical information mismatch, comprising:

historical information request procedure for requesting operation historical information for a recovered work-flow system to a historical information management server storing historical information of operations performed among servers of plural work-flow systems, based on system-down recovery notification or operator's manual notification;

historical information comparison procedure for comparing operation historical information provided from the historical information management server with historical information in the recovered system;

mismatch process job listing procedure for listing a mismatch processing job list based on historical information comparison; and mismatch process notification procedure for notifying mismatch processing job, based on historical information comparison to corresponding servers.

2. A computer-readable recording medium used to direct a computer to function in a particular manner when used by the computer for a server of a work-flow system recovered from system-down to detect operation historical information mismatch, comprising:

a historical information request procedure for requesting operation historical information for a recovered work-flow system to a historical information management server based on system-down recovery notification or operator's manual notification;

a historical information comparison procedure for comparing operation historical information provided from the historical information management server with historical information in the recovered system;

a mismatch process job listing procedure for listing a mismatch processing job list based on historical information comparison; and a mismatch process notification procedure for notifying mismatch processing job, based on historical information comparison, to corresponding servers, wherein said historical information comparison procedure by said recovered system server further comprises:
   a historical information group A defining procedure by sampling historical information containing action information having operation information between the recovered system server and other servers in historical information in the recovered system,
   a historical information group B defining procedure by sampling historical information containing action information having operation information between recovered system server and other servers in historical information for the recovered system on said historical information management server, and
   a group C defining procedure for mismatch detection by subtracting said group A from said group B.

3. A computer-readable recording medium used to direct a computer to function in a particular manner when used by the computer for a server of a work-flow system recovered from system-down to detect mismatch processing job, comprising:
   historical information request procedure for requesting historical information of operations performed between said server of the recovered system and server of other system to other servers by referring to a correlation table designating dependency relationships among servers, if necessary;
   historical information comparison procedure for comparing historical information provided from other servers with historical information in said recovered system;
   mismatch process job listing procedure for generating a mismatch processing job list based on the historical information comparison; and
   mismatch process notification procedure for notifying a mismatch processing job to corresponding servers, based on the historical information comparison between historical information in said recovered system server and historical information provided from said other servers.

4. A computer-readable recording medium used to direct a computer to function in a particular manner when used by the computer for a server of a work-flow system recovered from system-down to detect mismatch processing job, comprising:
   a historical information request procedure for requesting operation historical information by said server of the recovered system to other servers by referring to a correlation table designating dependency relationships among servers, if necessary;
   a historical information comparison procedure for comparing historical information provided from other servers with historical information in said recovered system;
   a mismatch process job listing procedure for generating a mismatch processing job list based on the historical information comparison; and
   a mismatch process notification procedure for notifying a mismatch processing job to corresponding servers, based on the historical information comparison between historical information of said recovered system server and historical information provided from said other servers,
   wherein said historical information comparison procedure further comprises:
      a historical information group A1 defining procedure by sampling historical information containing operation information to the recovered system server in historical information of other servers;
      a historical information group A2 defining procedure by sampling historical information containing operation information from the recovered system server in historical information of other servers;
      a historical information group B1 defining procedure by sampling historical information containing operation information to other servers in historical information in the recovered system server;
      a historical information group B2 defining procedure by sampling historical information containing operation information from other servers in historical information in the recovered system server;
      a mismatch historical information group C1 defining procedure by excluding historical information, having the same identification number as historical information contained in said group B2 has, from said group A1; and
      a mismatch historical information group C2 defining procedure by excluding historical information having the same identification number as historical information contained in said group B1 has from said group A2.

5. A computer-readable recording medium used to direct a computer to function in a particular manner when used by the computer to function in a particular manner when used by the computer for a historical information management server storing historical information of operations performed among severs of plural work-flow systems, to detect mismatch processing job, comprising:
   historical information request procedure for requesting historical information of operations performed between a server of a work-flow system recovered from system down and server of other system to recovered system server according to system-down recovery notification or operator's manual notification;
   historical information comparison procedure for comparing historical information with historical information for the recovered system on said historical information management server;
   mismatch processing job listing procedure for generating a mismatch processing job list; and
   mismatch processing job notification procedure for notifying mismatch process to corresponding servers, based on the comparison of historical information.

6. A computer-readable recording medium used to direct a computer to function in a particular manner when used by the computer for a historical information management server to detect mismatch processing job, comprising:
   a historical information request procedure for requesting historical information for a work-flow system recovered from system down to recovered system server by said historical information management server according to system-down recovery notification or operator's manual notification;
   a historical information comparison procedure for comparing historical information provided from said recovered system server with historical information for the recovered system on said historical information management server;
   a mismatch processing job listing procedure for generating a mismatch processing job list; and
   a mismatch processing job notification procedure for notifying mismatch process to corresponding servers, based on the comparison of historical information provided from said recovered system server with historical information on said historical information management server, wherein said historical information comparison procedure by said historical information management server further includes
a historical information group A defining procedure by sampling historical information containing action information having operation information among servers in historical information provided from the recovered system server,
a historical information group B defining procedure by sampling historical information containing action information having operation information among servers in historical information for the recovered work-flow system on said historical information management server, and
a group C defining procedure by subtracting said group A from said group B for mismatch detection.

7. A computer-readable recording medium used to direct a computer to function in a particular manner when used by the computer for a preservation server for preserving a whole wide area work-flow system to execute mismatch processing job detection procedure, comprising:
historical information request procedure for requesting historical information of operations performed between a server of a work-flow system recovered from system-down and server of other systems, and historical information for said recovered system on a historical information management server storing historical information of operations performed among servers of plural work-flow systems, to said recovered system server and said historical information management server respectively, according to system-down recovery notification or operator's manual notification;
historical information comparison procedure for comparing said historical information provided from the historical information management server with said historical information provided from said recovered system server;
mismatch process job listing procedure for listing mismatch processing job, based on the historical information comparison; and
mismatch process notification procedure for notifying the mismatch between said historical information provided from said historical information management server and said historical information provided from said recovered system server, to corresponding servers.

8. A computer-readable recording medium used to direct a computer to function in a particular manner when used by the computer for a preservation server for preserving a whole wide area work-flow system to execute mismatch processing job detection procedure, comprising:
a historical information request procedure, for requesting historical information for a work-flow system recovered from system-down and historical information for said recovered system on a historical information management server by said preservation server, to said recovered system server and said historical information management server respectively, according to system-down recovery notification or operator's manual notification;
a historical information comparison procedure for comparing said historical information on the historical information management server with said-historical information provided from said recovered system server by said preservation server;
a mismatch process job listing procedure for listing mismatch processing job, based on the historical information comparison; and a mismatch process notification procedure for notifying the mismatch between said historical information on said historical information management server and said historical information provided from said recovered system server, to corresponding servers,
wherein said historical information comparison procedure by said preservation server further comprises:
a historical information group A defining procedure by sampling historical information containing action information having operation information among servers in historical information of said recovered system server,
a historical information group B defining procedure by sampling historical information containing action information having operation information among servers in historical information for the recovered system on said historical information management server, and
a group C defining procedure by subtracting said group A from said group B for mismatch processing job detection.

9. A computer-readable recording medium used to direct a computer to function in a particular manner when used by the computer for a preservation server preserving a whole wide area work-flow system to detect mismatch processing job, comprising:
historical information request procedure for requesting historical information of operations performed between a server of a work-flow system recovered from system-down and server of other system to recovered system server, and historical information for said recovered system to other system serves, by said preservation server, which refers to a correlation table designating dependency relationship, if necessary, according to system-down recovery notification or operator's manual notification;
historical information comparison procedure for comparing historical information from other system servers with said historical information from said recovered system server;
mismatch processing job listing procedure for listing a mismatch processing job list; and
mismatch process notification procedure for notifying said mismatch processing job to corresponding servers.

10. A computer-readable recording medium used to direct a computer to function in a particular manner when used by the computer for a preservation server preserving a whole wide area work-flow system to detect mismatch processing job without including a historical information management server, comprising:
historical information request procedure for requesting historical information to server of a work-flow system recovered from system-down and historical information for said recovered system to other system servers, by said preservation server, which refers to a correlation table designating dependency relationship, if necessary, according to system-down recovery notification or operator's manual notification;
a historical information comparison procedure for comparing historical information from other system servers with said historical information from said recovered system server, by said preservation server;
a mismatch processing job listing procedure for listing a mismatch processing job list; and
a mismatch process notification procedure for notifying said mismatch processing job to corresponding servers, wherein said server historical information comparison procedure further includes a historical information group A1 defining procedure by sampling historical information containing operation information to said recovered system server in historical information from other system server, a historical information group A2 defining procedure by sampling historical information containing operation information from said recovered system server in said historical information from other system server, a historical information group B1 defining procedure by sampling historical information containing operation information to other system servers in historical information from recovered system server, a historical information group B2 defining procedure by sampling historical information containing operation information from other system servers in historical information from recovered system server, a mismatch historical information group C1 defining procedure by excluding historical information, having the same identification number as historical information contained in said group B2 has, from said group A1, and a mismatch historical information group C2 defining procedure by excluding historical information, having the same identification number as historical information contained in said group B1 has, from said group A2.

11. A wide area work-flow system in which plural work-flow systems each including a database for storing at least operation historical information about operations performed between the self work-flow system and other work-flow systems, and each operating processing jobs automatically according to a work-flow defining a processing job flow, operate with linking via a wide area network, comprising:

historical information storing means for storing operation historical information about operations performed among said plural work-flow systems; and historical information management means for maintaining reliability for a whole linking operation of said wide area work-flow system by comparing, when a work-flow system is recovered from a system-down, operation historical information stored in said historical information storing means about operations of said recovered work-flow system, with operation historical information provided by said recovered work-flow system about operations performed between said recovered work-flow system and other work-flow system, thereby detecting a mismatch between the operation historical information.

12. The maintenance system defined in claim 11, wherein said plural work-flow systems are client/server systems each including one server and more than one client managed by said one server.

13. The maintenance system according to claim 11, wherein said historical information storing means stores at least historical information for operation among work-flow systems as operation historical information for each of the work-flow systems.

14. The wide area work-flow system according to claim 11, wherein said historical information management means further comprises a correlation table designating whether or not a dependency relationship among work-flow operations of said plural work-flow systems exists.

15. A wide area work-flow system in which plural work-flow systems each including a database for storing at least operation historical information about operations performed between the self work-flow system and other work-flow system, and each operating processing jobs automatically according to a work-flow defining a processing job flow, operate with linking via a wide area network, comprising:

historical information storing means for storing operation historical information about operations performed among said plural work-flow systems, wherein each of said plural work-flow systems comprises a historical information management means for maintaining reliability for a whole linking operation of said wide area work-flow system by comparing, when the self work-flow system is recovered from a system-down, operation historical information provided by said historical information storing means about the self work-flow system with operation historical information stored in the self work-flow system, thereby detecting a mismatch between the operation historical information.

16. Each work-flow system among plural work-flow systems provided in a wide area work-flow system, which includes a database for storing at least operation historical information about operations performed between the self work-flow system and other work-flow system, and which operates processing jobs automatically according to a work-flow defining a processing job flow, for operating with linking via a wide area network, comprising:

historical information management means for maintaining reliability for a whole linking operation of said wide area work-flow system by comparing, when the self work-flow system is recovered from a system-down, historical information provided by other work-flow systems about operations performed between the other work-flow system and the self work-flow system with operation historical information stored in the self work-flow system, thereby detecting a mismatch between the operation historical information.

17. The work-flow system according to claim 16, wherein each work-flow system further comprises a correlation table for designating whether or not a dependency relationship between operations of other work-flow systems and operations of the self work-flow system exists.

18. A wide area work-flow system in which plural work-flow systems each including a database for storing at least operation historical information about operations performed between the self work-flow system and other work-flow systems, and each operating a processing job automatically according to a work-flow defining a processing job flow, operate with linking via a wide area network, comprising:

historical information storing means for storing operation historical information about operations performed among said plural work-flow systems; and preservation means for maintaining reliability for a whole linking operation of said wide area work-flow system by comparing, when any one of said plural work-flow systems is recovered from a system-down, operation historical information provided by said historical information storing means about said recovered work-flow system with operation historical information provided by said recovered system about operations performed between said recovered work-flow system and other work-flow systems, thereby detecting a mismatch between the operation historical information.

19. A wide area work-flow system in which plural work-flow systems each including a database for storing at least operation historical information about operations performed between the self work-flow system and other work-flow systems, and each operating a processing job automatically according to a work-flow defining a processing job flow, operate with linking via a wide area network, comprising:

preservation means for maintaining reliability for a whole linking operation of said wide area work-flow system by comparing, when any one of said plural work-flow systems is recovered from a system-down, operation historical information provided by said recovered work-flow system about operations performed between said recovered work-flow system and other work-flow systems with operation historical information provided by the other work-flow system about said recovered work-flow system, thereby detecting a mismatch between the operation historical information.

20. The wide area work-flow system according to claim 19, wherein said preservation means further comprises a correlation table designating whether or not a dependency relationship among work-flow operations of said plural work-flow systems exists.

21. A maintenance system for a wide area work-flow system in which plural work-flow systems each operating a processing job automatically according to a work-flow defining a processing job flow, operate with linking via a wide area network, wherein a server of a work-flow system recovered from a system-down requests operation historical information about the self server from a historical information management server for storing operation historical information about operations performed among servers of said plural work-flow systems, said historical information management server provides the requested operation historical information to the server of said recovered work-flow system, and the server of said recovered work-flow system compares the provided operation historical information with operation historical information stored in the self server, thereby detecting a mismatch between the operation historical information about the self server.

22. A maintenance system for a wide area work-flow system in which plural work-flow systems each operating a processing job automatically according to a work-flow defining a processing job flow, operate with linking via a wide area network, wherein a server of a work-flow system recovered from a system-down requests a server of other work-flow systems of which operation has a dependency relationship with an operation of a work-flow in the self system to provide operation historical information about the self server, and the server of said recovered work-flow system compares the provided operation historical information with operation historical information stored in the self server, thereby detecting a mismatch between the operation historical information about the self server.

23. A maintenance system for a wide area work-flow system in which plural work-flow systems each operating a processing job automatically according to a work-flow defining a processing job flow, operate with linking via a wide area network, wherein a server of a work-flow system recovered from a system-down notifies self-system recovery to a historical information management server storing operation historical information about operations performed among servers of said plural work-flow systems, said historical information management server requests a server of said recovered work-flow system to provide operation historical information about operations performed between said recovered server and a server of other work-flow systems, stored in the server of said recovered work-flow system, the server of said recovered work-flow system provides the requested operation historical information, and said historical information management server compares the provided operation historical information and operation historical information stored in the self historical management server about the server of said recovered work-flow system, thereby detecting a mismatch between the operation historical information about the server of said recovered work-flow system.

24. A maintenance system for a wide area work-flow system in which plural work-flow systems each operating a processing job automatically according to a work-flow defining a processing job flow, operate with linking via a wide area network, wherein a server of a work-flow system recovered from a system-down notifies self-system recovery to a preservation server for preserving a whole wide area work-flow system, said preservation server requests the server of said recovered work-flow system to provide operation historical information about operations performed between the server of said recovered work-flow system and a server of other work-flow systems, and requests a historical information management server storing operation historical information about operations performed among servers of said plural work-flow systems to provide operation historical information about the server of said recovered work-flow system, said historical information management server compares two kinds of provided operation historical information, and detects a mismatch between the operation historical information about the server of said recovered work-flow system.

25. A maintenance system for a wide area work-flow system in which plural work-flow systems each operating a processing job automatically according to a work-flow defining a processing job flow, operate with linking via a wide area network, wherein a server of a work-flow system recovered from a system-down notifies self-system recovery to a preservation server for preserving a whole wide area work-flow system, said preservation server requests the server of said recovered work-flow system to provide operation historical information about operations performed between the server of said recovered work-flow system and a server of other work-flow systems, and requests the server of other work-flow systems of which operation has a dependency relationship with an operation performed in a work-flow of said recovered work-flow system to provide operation historical information about the server of said recovered work-flow system, and said preservation server compares plural kinds of operation historical information provided by the server of said recovered work-flow system and the server of the other work-flow system, and detects a mismatch between the operation historical information about the server of said recovered work-flow system.

26. A maintenance method for use in a wide area work-flow system in which plural work-flow systems operating processing jobs automatically according to a work-flow defining a processing job flow, operate with linking via a wide area network, comprising the steps of:

requesting, by a server of a work-flow system recovered from system-downs, operation historical information about a self server from a historical information management server for storing operation historical information about operations performed among servers of the plural work-flow systems;

providing, by the historical information management server, the requested operation historical information for the server of the recovered system; and comparing, by the server of the recovered system, the provided operation historical information with operation historical information stored in the self server, thereby detecting a mismatch between the operation historical information with regard to the self server.

27. A maintenance method for use in a wide area work-flow system in which plural work-flow systems operating processing jobs automatically according to a work-flow defining a processing job flow, operate with linking via a wide area network, comprising the steps of:

requesting, by a server of a work-flow system recovered from system-downs, operation historical information about a self work-flow system from a server of another work-flow system in which a dependency relationship between work-flow operations of the self work-flow system and those of the another work-flow system exists; and comparing, by the server of the recovered system, the provided operation historical information with operation historical information stored in the self server, thereby detecting a mismatch between the operation historical information with regard to the self server.

28. A maintenance method for use in a wide area work-flow system in which plural work-flow systems operating processing jobs automatically according to a work-flow defining a processing job flow, operate with linking via a wide area network, comprising the steps of:

informing, by a server of a work-flow system recovered from system-downs, an operation historical information management server for storing operation historical information about operations performed between servers of the plural work-flow systems about recovery of a self system;

requesting, by the historical information management server, operation historical information stored in the recovered server about operations performed between the recovered server and a server of another system from the server of the recovered system;

providing, by the recovered server, the requested operation historical information; and comparing, by the historical information management server, the provided operation historical information with operation historical information stored in a self historical information management server about the server of the recovered system, thereby detecting a mismatch between the operation historical information with regard to the server of the recovered system.

29. A maintenance method for use in a wide area work-flow system in which plural work-flow systems operating processing jobs automatically according to a work-flow defining a processing job flow, operate with linking via a wide area network, comprising the steps of:

informing, by a server of a work-flow system recovered from system-downs, a preservation server for preserving a whole wide area work-flow system about recovery of a self system;

requesting, by the preservation server, operation historical information about operations performed between the server of the recovered system and a server of another system from the server of the recovered system, and also requesting operation historical information about the server of the recovered system from a historical information management server for storing operation historical information about operations performed among servers of the plural work-flow systems; and comparing, by the preservation server, two pieces of provided operation historical information, thereby detecting a mismatch between the operation historical information with regard to the server of the recovered system.

30. A maintenance method for use in a wide area work-flow system in which plural work-flow systems operating processing jobs automatically according to a work-flow defining a processing job flow, operate with linking via a wide area network, comprising the steps of:

informing, by a server of a work-flow system recovered from system-downs, a preservation server for preserving a whole wide area work-flow system about recovery of a self system;

requesting, by the preservation server, operation historical information about operations performed between the recovered server and a server of another system from the server of the recovered system, and also requesting operation historical information about the recovered server from a server of another work-flow system in which a dependency relationship between work-flow operations of the recovered work-flow system and those of the another work-flow system exists, thereby detecting a mismatch between the operation historical information with regard to the server of the recovered system.

* * * * *